United States Patent Office 3,343,968
Patented Sept. 26, 1967

3,343,968
CONTROL OF MOLD GROWTH IN EGGS
Charles Norman Huhtanen, New Hope, Pa., assignor to American Cyanamid Company, Stamford, Conn., a corporation of Maine
No Drawing. Filed Mar. 19, 1965, Ser. No. 441,363
5 Claims. (Cl. 99—161)

ABSTRACT OF THE DISCLOSURE

Method of inhibiting mold infection in eggs involving treating or cleaning the shell surface of eggs with a solution containing an effective amount of one of the antibiotics nystatin, pimaricin, or amphotericin B in concentrations as low as 10 p.p.m. of pimaricin, 25 p.p.m. of nystatin or as little as 0.83 p.p.m. of amphotericin B.

---

This invention relates to a novel method for controlling mold growth in eggs and more particularly is concerned with mold growth in eggs by applying to the shells of the eggs a fungicidal amount of a polyene antibiotic, in particular, nystatin, pimaricin, and amphotericin B.

The antiobiotics nystatin, pimaricin, and amphotericin B are well known. Nystatin is described in United States Patent No. 2,797,183. Pimaricin is described by A. P. Struyk et al., Antibiotics Annual (1957–1958), 878 (Medical Encyclopedia Inc., New York, 1958). Amphotericin B is described by J. D. Dutcher et al., in United States Patent No. 2,908,611.

Since the poultry industry is founded entirely on egg production, that which affects such production affects the industry directly, regardless of whether the result is beneficial or harmful. For this reason the poultry industry has been rigorously controlled as to the facilities for raising the poultry as well as to the products produced. For quality egg production the industry has found it necessary to clean the eggs prior to marketing and this practice is followed whether the eggs are infertile and are to be sold for consumption or are fertile and are to be used as hatching stock.

Cleaning of eggs has been accomplished by any of several means, as, for example, by abrading the shell surface with a fine grit or by washing the eggs with an aqueous, detergent-containing solution. While this latter practice is most convenient and has been quite successful, it has become increasingly evident that the washing solutions are frequently carriers for mold spores and are responsible for mold infection in the eggs. In this regard, several studies have been made which indicate that hatching embryos are readily contaminated by the organism *Aspergillus fumigatus*. Further, such infection has been traced to the egg washing operation. Also, there is evidence to show that where the hatching embryos are infected with spores of Aspergillus organisms, the incidence of aspergillosis infection in the hatched chicks is increased. Where infertile eggs are infected with molds, the eggs putrefy and are worthless.

It is, therefore, an object of this invention to provide a means of destroying mold spores in water, particularly water employed for cleaning eggs.

It is also an object of the invention to provide a means of inhibiting mold infection in eggs.

Briefly, the present invention involves treating or cleaning the shell surface of eggs with a solution containing a fungicidally effective amount of one of the three polyene antibiotics.

The amount of antifungal antibiotic varies somewhat. Thus, pimaricin has been found to be effective in preventing mold growth in eggs with concentrations as low as 10 p.p.m. while nystatin requires about 25 p.p.m. to give an effective measure of mold control. Amphotericin B, on the other hand, seems to be the most effective agent and has given 68% mold protection with concentrations as low as 0.83 p.p.m., which concentration is roughly comparable to pimaricin at 25 p.p.m.

The upper limit of each of these antibiotics is not unduly critical and depends mainly upon cost. My experience so far indicate that 400 p.p.m. of any of the above fungicides gives substantially maximum protection.

It has also been found that the addition of from about 0.1% to about 5% by weight of a solubilizing agent such as dimethylsulfoxide, dimethylformamide, a mixture of methoxyethanol and calcium chloride, formamide, lower alcohols, methylpyrrolidone, glacial acetic acid, or propylene glycol is useful in preparing the solutions and such addition appears to enhance the mold inhibiting activity of the fungicide. For maximum stability of the antibiotic, it is desirable to maintain the pH value of the solution at between about 4.0 and 10.0, although somewhat higher or lower pH values may be employed.

The following examples are provided only by way of illustration of the invention and are not to be construed as limiting thereon.

Example 1

The mold cultures employed in the following tests were *Aspergillus fumigatus* and *Aspergillus flavus* both of which have been implicated in aspergillosis infections in chicks. The molds were grown on nutrient agar for one week at room temperature and the spores washed off with water. Spore counts were made by plating an orange-serum agar. The eggs used were obtained from local hatcheries before washing and upon delivery were placed in an incubator at 98° F. for 4–16 hours. After incubation the eggs were dipped in demineralized water at approximately 20° C.—the temperature differential between the egg and the dip water insuring diffusion of spores and test materials with the egg. The dip time was ten minutes in all experiments. Dipping was accomplished by placing the eggs in a basket and immersing in 3 gallons of water in a large container. The basket and eggs were agitated several times during the dip period by gently raising and lowering.

Following the immersion period the eggs were immediately placed back in the incubator. The incubator was humidified by means of a tray of water at the bottom and was a forced draft type of egg incubator. The trays containing the eggs were tilted approximately 30° daily. Examination for molds was done by candling at appropriate intervals, the mold usually showed up well as a fuzzy darkened area on the edge of the air space. The green color of *A. fumigatus* could also be detected by candling. The first examination was made six days after treatment (7 days embryo age) at which time infertile eggs and those failing to develop were noted. The dominant characteristic of the latter group was the appearance of a blood ring in the egg indicating initial development followed by death. Subsequent examinations were made at intervals to 20 days of age except for several groups of dead embryos which were followed to 28 days. At 20 days, live chicks were determined by observation of movement in the egg.

Table I shows the effect of the spores of *A. fumigatus* and *A. flavus* on fertile and infertile eggs. Nineteen days after dip (20 days embryo age) only 3 out of 70 infertile eggs were infected with *A. fumigatus* while 62 out of 70 of the fertile eggs were found to harbor the organism. *A. flavus* showed a higher rate of infertile egg contamination; however, this was also considerably less than the incidence in the fertile eggs. Prolonged incubation of the infertile eggs increased the number of infected. All calculations of mold infectivity were based on total eggs minus infertiles.

TABLE I

[Incidence of Aspergillosis in fertile and infertile eggs following immersion in spore-inoculated water]

| Additions to dip water | Condition of eggs | Total eggs | Days After Treatment— | | | | | | |
|---|---|---|---|---|---|---|---|---|---|
| | | | 15 | 19 | 21 | 22 | 27 | 29 | 33 |
| | | | Total Number Molded | | | | | | |
| None | Infertile | 70 | 0 | 0 | 0 | 0 | 2 | 3 | 3 |
| A. flavus spores, $1.1 \times 10^4$/ml | do | 70 | 7 | 13 | 16 | 16 | 18 | 25 | 27 |
| A. fumigatus spores, $1.1 \times 10^4$/ml | do | 70 | 1 | 3 | 12 | 13 | 15 | 20 | 23 |
| None | Fertile | 70 | | 0 | | | | | |
| A. flavus spores, $1.1 \times 10^4$/ml | do | 70 | | 22 | | | | | |
| A. fumigatus spores, $1.1 \times 10^4$/ml | do | 70 | | 62 | | | | | |

Note.—Eggs incubated overnight before dipping. Water used for dipping was demineralized and equilibrated overnight at room temperature.

*Example 2*

To assess the value of pimaricin in alleviating mold infection in eggs, they were experimentally infected with the mold organism *A. fumigatus* and *A. flavus* by the procedure set forth in Example 1 above. The eggs used in this experiment showed an abnormally high rate of early dead embryos caused possibly by improper temperature during holding at the hatchery. These early dead embryos were included in the calculations of mold growth. Very few molds developed during the first six days after treatment while at 13 days, *A. fumigatus* showed 37% infectivity. At 19 days, this mold infected 91% of the embryos at the spore concentration used (10,000 spores per ml. dip water). Pimaricin at 100 p.p.m. showed 67% protection at 13 days and 22% at 19 days with *A. fumigatus*. The degree of protection against *A. flavus* was higher—92% at 13 days and 77% at 19 days. It is apparent from this experiment that the "detergent" normally used for washing eggs does not destroy the spores of *A. fumigatus* or *A. flavus*. The results of these tests appear in Table II below.

*Example 3*

The experiment shown in Table III below was conducted in a similar manner to the preceding tests except that the embryos were eight days old at the time of dipping. The purpose of this test was to determine the infectiveness of the molds in older embryos as well as to determine the effect of the dipping on their survival. The results of this experiment were similar to the preceding. Pimaricin at 100 p.p.m. gave 70% protection against *A. flavus* and 61% against *A. fumigatus*. A considerable number of the plain water dipped eggs developed mold, indicating some contamination of the demineralized water.

TABLE III

[Incidence of aspergillosis in embryos treated at eight days of age with pimaricin]

| Additions to dip water | Total Eggs | Condition at 20 Days of Age [1] | | | | | | Protection, percent |
|---|---|---|---|---|---|---|---|---|
| | | Hatchable | | Dead | | Mold | | |
| | | No. | Percent | No. | Percent | No. | Percent | |
| No dip, control | 53 | 50 | 94 | 3 | 6 | 0 | 0 | |
| None | 50 | 27 | 54 | 11 | 22 | 12 | 24 | |
| A. flavus spores, $1.1 \times 10^4$/ml | 47 | 34 | 72 | 10 | 21 | 3 | 7 | |
| A. flavus spores, 0.25% detergent | 50 | 38 | 76 | 5 | 10 | 7 | 14 | 0 |
| A. flavus spores, 100 p.p.m. pimaricin | 51 | 45 | 88 | 5 | 10 | 1 | 2 | 70 |
| A. fumigatus spores, $1.1 \times 10^4$/ml | 50 | 1 | 2 | 3 | 6 | 46 | 92 | |
| A. fumigatus spores, 0.25% detergent | 48 | 0 | 0 | 2 | 4 | 46 | 96 | 0 |
| A. fumigatus spores, 100 p.p.m. pimaricin | 50 | 16 | 32 | 16 | 32 | 18 | 36 | 61 |

[1] 12 days after dip.

Note.—Eggs were purchased at seven days of age and incubated overnight before dipping. Dip water was demineralized water equilibrated overnight at room temperature.

*Example 4*

In an effort to determine the response of pimaricin on different spore concentrations of *A. fumigatus*, the experiment shown in Table IV was conducted. The highest level of spores was $1.1 \times 10^4$ per ml.—the same as in previous experiments. Tenfold dilutions were made to a spore concentration of 1.1 per ml. The dip water again

TABLE II

[*Aspergillus flavus* and *A. fumigatus* as causative agents of aspergillosis in hatching embryos]

| Additions to dip water | Total eggs | Infertile | Early dead | Days Following Treatment— | | | | | |
|---|---|---|---|---|---|---|---|---|---|
| | | | | 6 | | | 13 | | |
| | | | | Molded | | Protection | Molded | | Protection |
| | | | | No. | Percent [1] | Percent [1] | No. | Percent [1] | Percent [1] |
| No dip, control | 70 | 7 | 27 | 0 | 0 | | 0 | 0 | |
| None | 68 | 4 | 29 | 0 | 0 | | 1 | 2 | |
| A. flavus ($1.1 \times 10^4$ spores/ml.) | 68 | 3 | 18 | 3 | 5 | | 8 | 12 | |
| A. flavus, 0.25% detergent | 68 | 3 | 19 | 4 | 6 | | 4 | 6 | 50 |
| A. flavus, 100 p.p.m. pimaricin | 70 | 1 | 24 | 0 | 0 | 100 | 1 | 1 | 92 |
| A. fumigatus ($1.1 \times 10^4$ spores/ml.) | 70 | 2 | 24 | 1 | 1 | | 25 | 37 | |
| A. fumigatus, 0.25% detergent | 68 | 4 | 27 | 4 | 6 | 0 | 24 | 37 | 0 |
| A. fumigatus, 100 p.p.m. pimaricin | 69 | 2 | 28 | 1 | 1 | 0 | 8 | 12 | 67 |

(continued)

| Additions to dip water | 19 | | |
|---|---|---|---|
| | Molded | | Protection |
| | No. | Percent [1] | Percent [1] |
| No dip, control | 0 | 0 | |
| None | 3 | 5 | |
| A. flavus ($1.1 \times 10^4$ spores/ml.) | 22 | 35 | |
| A. flavus, 0.25% detergent | 23 | 35 | 0 |
| A. flavus, 100 p.p.m. pimaricin | 6 | 9 | 77 |
| A. fumigatus ($1.1 \times 10^4$ spores/ml.) | 62 | 91 | |
| A. fumigatus, 0.25% detergent | 52 | 81 | 11 |
| A. fumigatus, 100 p.p.m. pimaricin | 48 | 71 | 22 |

[1] Percent molds and percent based on total eggs minus infertiles.

Note.—Eggs incubated overnight before treatment. Water used was demineralized water equilibrated overnight at room temperature.

showed the presence of the mold contaminant giving a mold infection rate of 34%. Added spores at 1.1 and 11 per ml. did not increase the percent infectivity. Addition of 110 spores per ml., however, showed a large increase in numbers of infected eggs while 1100 and 11,000 spores per ml. produce even larger rates of infection. Pimaricin at 100 p.p.m. was very effective at spore concentrations of 1100 per ml. and below, while at the higher level, a considerable reduction in activity was apparent.

Nystatin showed a limited degree of protection, pimaricin was considerably better and amphotericin B showed 100% protection at a level of 25 p.p.m. compared with 62% protection with pimaricin at the same concentration. This experiment was carried further by removing the hatchable embryos at 20 days of age and re-incubating the dead embryos for another week (Table VII). The results at 20 and 27 days were very similar, indicating considerable numbers of embryos candled as dead at hatchtime

TABLE IV

[Effect of spore concentrations on incidence of aspergillosis in hatching embryos]

| Addition to dip water | No. A. fumigatus, spores/ml. dip water | Total Eggs | Infertiles | Condition at 20 days of age [1] | | | | Mold Protection, Percent [2] |
|---|---|---|---|---|---|---|---|---|
| | | | | Hatchable | | Molded | | |
| | | | | No. | Percent [2] | No. | Percent [2] | |
| No dip, control | | 65 | 12 | 46 | 87 | 0 | 0 | |
| 0 | 0 | 64 | 2 | 31 | 50 | 21 | 34 | |
| Pimaricin, 100 p.p.m | 0 | 65 | 10 | 47 | 86 | 3 | 6 | 84 |
| 0 | 1.1 | 65 | 3 | 29 | 47 | 20 | 32 | |
| Pimaricin, 100 p.p.m | 1.1 | 65 | 7 | 52 | 90 | 0 | 0 | 100 |
| 0 | 11 | 65 | 10 | 29 | 53 | 16 | 29 | 28 |
| Pimaricin, 100 p.p.m | 11 | 65 | 7 | 50 | 86 | 3 | 5 | -- |
| 0 | 110 | 64 | 9 | 15 | 27 | 31 | 56 | |
| Pimaricin, 100 p.p.m | 110 | 63 | 1 | 55 | 89 | 1 | 2 | 97 |
| 0 | 1,100 | 65 | 5 | 5 | 8 | 47 | 86 | |
| Pimaricin, 100 p.p.m | 1,100 | 65 | 6 | 39 | 66 | 6 | 10 | 88 |
| 0 | 11,000 | 65 | 5 | 11 | 18 | 44 | 73 | |
| Pimaricin, 100 p.p.m | 11,000 | 65 | 9 | 23 | 41 | 21 | 38 | 48 |

[1] 19 days after dip.
[2] Based on total eggs minus infertiles.
NOTE.—Eggs were purchased at zero days of age and were incubated overnight before treatment. Water for dip was demineralized water equilibrated overnight at room temperature.

*Example 5*

The following tests were run employing the procedure of Example 1 and using different levels of pimaricin in the dip water. Table V shows the effect of different levels of pimaricin on the rate of infection of 110 spores per ml. of *A. fumigatus* or of 1100 spores per ml. Maximum protection occurred between 50 and 100 p.p.m. pimaricin, although about 40% protection was evident at concentrations as low as 12.5 p.p.m.

were actually infected with the mold. It was noted throughout these experiments that embryos usually died a day or two before the mold was evident on candling.

*Example 7*

Another experiment was set up to determine the most active concentration of amphotericin B. The results are shown in Table VIII below. Near maximum protection was afforded by 8.3 p.p.m. in the dip water. A comparable level of pimaricin activity was around 100 p.p.m. At a

TABLE V

[Effect of different levels of pimaricin on incidence of aspergillosis in hatching embryos]

| Addition to dip water | No. A. fumigatus, spores/ml. dip water | Total Eggs | Infertiles | Condition at 20 days of age [1] | | | | Mold Protection, Percent |
|---|---|---|---|---|---|---|---|---|
| | | | | Hatchable | | Molded | | |
| | | | | No. | Percent [2] | No. | Percent [2] | |
| 0 | 0 | 70 | 6 | 51 | 81 | 0 | 0 | |
| 0 | 110 | 70 | 7 | 22 | 35 | 27 | 43 | |
| Pimaricin, 12.5 p.p.m | 110 | 69 | 7 | 22 | 36 | 16 | 26 | 40 |
| Pimaricin, 25.0 p.p.m | 110 | 70 | 4 | 46 | 70 | 8 | 12 | 72 |
| Pimaricin, 50.0 p.p.m | 110 | 70 | 2 | 51 | 75 | 4 | 6 | 86 |
| Pimaricin, 100.0 p.p.m | 110 | 70 | 3 | 55 | 82 | 2 | 3 | 93 |
| Pimaricin, 200.0 p.p.m | 110 | 69 | 10 | 49 | 83 | 2 | 3 | 93 |
| Pimaricin, 400.0 p.p.m | 110 | 69 | 8 | 51 | 84 | 2 | 3 | 93 |
| 0 | 1,100 | 70 | 8 | 2 | 3 | 39 | 63 | |
| Pimaricin, 12.5 p.p.m | 1,100 | 70 | 5 | 14 | 22 | 22 | 34 | 46 |
| Pimaricin, 25.0 p.p.m | 1,100 | 70 | 5 | 24 | 37 | 16 | 25 | 60 |
| Pimaricin, 50.0 p.p.m | 1,100 | 70 | 8 | 41 | 66 | 6 | 10 | 84 |
| Pimaricin, 100.0 p.p.m | 1,100 | 70 | 7 | 45 | 71 | 10 | 16 | 75 |
| Pimaricin, 200.0 p.p.m | 1,100 | 70 | 7 | 50 | 79 | 2 | 3 | 95 |
| Pimaricin, 400.0 p.p.m | 1,100 | 70 | 7 | 55 | 87 | 1 | 2 | 97 |

[1] 19 days after dip.
[2] Based on total eggs minus infertiles.
NOTE.—Eggs were purchased at zero days of age and were incubated overnight before treatment. Water for dip was demineralized water passed through millipore filter to remove microorganisms and was equilibrated overnight at room temperature.

*Example 6*

Employing the procedure of Example 1, the relative effectiveness of nystatin, pimaricin, and emphotericin B for controlling mold growth in eggs was determined and the data are shown in Table VI.

lower level of 0.83 p.p.m., amphotericin B showed 68% protection, roughly comparable to pimaricin at 25 p.p.m. The degree of activity of nystatin, pimaricin, and amphotericin B would be roughly in the order of 1:4:40— amphotericin B being 40 times as active as nystatin and 10 times as active as pimaricin.

TABLE VI

[Effect of different fungicides on incidence of aspergillosis in hatching embryos]

| Fungicide addition to dip water | No. *A. fumigatus*, spores/ml. dip water | Total Eggs | Infertiles | Condition at 20 days of age [1] | | | | Mold Protection Percent [2] |
|---|---|---|---|---|---|---|---|---|
| | | | | Hatchable | | Molded | | |
| | | | | No. | Percent [2] | No. | Percent [2] | |
| No dip, control | | 97 | 10 | 69 | 79 | 0 | 0 | |
| 0 | 0 | 70 | 3 | 48 | 72 | 1 | 1 | |
| 0 | 110 | 70 | 3 | 13 | 19 | 39 | 58 | |
| Nystatin, 25 p.p.m | 110 | 70 | 7 | 35 | 55 | 15 | 24 | 59 |
| Nystatin, 100 p.p.m | 110 | 70 | 9 | 35 | 57 | 16 | 26 | 55 |
| Nystatin, 400 p.p.m | 110 | 70 | 7 | 41 | 65 | 7 | 11 | 81 |
| Pimaricin, 25 p.p.m | 110 | 70 | 10 | 30 | 50 | 13 | 22 | 62 |
| Pimaricin, 100 p.p.m | 110 | 69 | 8 | 47 | 77 | 3 | 5 | 92 |
| Pimaricin, 400 p.p.m | 110 | 69 | 5 | 45 | 70 | 1 | 1 | 97 |
| Amphotericin B, 25 p.p.m | 110 | 68 | 6 | 52 | 84 | 0 | 0 | 100 |
| Amphotericin B, 100 p.p.m | 110 | 70 | 4 | 61 | 92 | 0 | 0 | 100 |
| Amphotericin B, 400 p.p.m | 110 | 69 | 3 | 58 | 88 | 0 | 0 | 100 |

[1] 19 days after dip.
[2] Based on total eggs minus infertiles.

NOTE.—Eggs purchased at zero days of age and were incubated 4 hours prior to treatment. Water for dip was demineralized water sterilized by passing through millipore filter and equilibrated overnight at room temperature.

TABLE VII

[Effect of different fungicides on post-hatch mold development]

| Fungicide addition to dip water | No. *A. fumigatus*, spores/ml. dip water | Total Eggs | Infertiles | Time After Dip— | | | | | | |
|---|---|---|---|---|---|---|---|---|---|---|
| | | | | 19 days | | | 27 days | | | |
| | | | | Molded | | Mold Protection, Percent [1] | Molded | | Mold Protection Percent [1] | |
| | | | | No. | Percent [1] | | No. | Percent [1] | | |
| No dip, control | | 97 | 10 | 0 | 0 | | 0 | 0 | | |
| 0 | 0 | 70 | 3 | 1 | 1 | | 2 | 3 | | |
| 0 | 110 | 70 | 3 | 39 | 58 | | 49 | 73 | | |
| Nystatin, 25 p.p.m | 110 | 70 | 7 | 15 | 24 | 59 | 17 | 27 | 63 | |
| Nystatin, 100 p.p.m | 110 | 70 | 9 | 16 | 26 | 55 | 17 | 28 | 62 | |
| Nystatin, 400 p.p.m | 110 | 70 | 7 | 7 | 11 | 81 | 10 | 16 | 78 | |
| Pimaricin, 25 p.p.m | 110 | 70 | 10 | 13 | 22 | 62 | 19 | 32 | 56 | |
| Pimaricin, 100 p.p.m | 110 | 69 | 8 | 3 | 5 | 92 | 5 | 8 | 88 | |
| Pimaricin, 400 p.p.m | 110 | 69 | 5 | 1 | 1 | 97 | 1 | 2 | 97 | |
| Amphotericin B, 25 p.p.m | 110 | 68 | 6 | 0 | 0 | 100 | 0 | 0 | 100 | |
| Amphotericin B, 100 p.p.m | 110 | 70 | 4 | 0 | 0 | 100 | 0 | 0 | 100 | |
| Amphotericin B, 400 p.p.m | 110 | 69 | 3 | 0 | 0 | 100 | 0 | 0 | 100 | |

[1] Based on total eggs minus infertiles.

NOTE.—Eggs purchased at zero days of age and were incubated 4 hours prior to treatment. Water for dip was demineralized water sterilized by passing through millipore filter and was equilibrated overnight at room temperature.

TABLE VIII

[Comparison of pimaricin, nystatin, and amphotericin B as therapeutic agents for aspergillosis in hatching embryos]

| Fungicide addition to dip water | No. *A. fumigatus*, spores/ml. dip water | Total Eggs | Infertiles | Condition at 20 days of age [1] | | | | Mold Protection, Percent [2] |
|---|---|---|---|---|---|---|---|---|
| | | | | Hatchable | | Molded | | |
| | | | | No. | Percent [2] | No. | Percent [2] | |
| No dip, control | | 70 | 3 | 42 | 63 | 0 | 0 | |
| 0 | 0 | 70 | 5 | 35 | 54 | 0 | 0 | |
| 0 | 110 | 70 | 8 | 12 | 19 | 28 | 45 | |
| Pimaricin, 25 p.p.m | 110 | 69 | 3 | 32 | 48 | 14 | 21 | 53 |
| Pimaricin, 100 p.p.m | 110 | 70 | 4 | 38 | 59 | 2 | 3 | 93 |
| Pimaricin, 400 p.p.m | 110 | 70 | 3 | 45 | 67 | 1 | 2 | 97 |
| Nystatin, 25 p.p.m | 110 | 70 | 8 | 9 | 18 | 27 | 44 | 2 |
| Nystatin, 100 p.p.m | 110 | 70 | 3 | 29 | 45 | 15 | 22 | 46 |
| Amphotericin B, 25 p.p.m | 110 | 70 | 3 | 39 | 60 | 0 | 0 | 100 |
| Amphotericin B, 25 p.p.m | 110 | 67 | 8 | 32 | 52 | 1 | 2 | 97 |
| Amphotericin B, 8.3 p.p.m | 110 | 68 | 7 | 41 | 65 | 1 | 2 | 97 |
| Amphotericin B, 2.5 p.p.m | 110 | 70 | 8 | 27 | 45 | 7 | 11 | 75 |
| Amphotericin B, 0.83 p.p.m | 110 | 70 | 4 | 35 | 53 | 9 | 14 | 68 |
| Amphotericin B, 0.25 p.p.m | 110 | 69 | 8 | 14 | 23 | 26 | 42 | 7 |
| Amphotericin B, 0.08 p.p.m | 110 | 70 | 7 | 13 | 21 | 26 | 41 | 7 |

[1] 19 days after dip.
[2] Based on total eggs minus infertiles.

NOTE.—Eggs purchased at zero days of age and were incubated overnight prior to treatment. Water for dip was demineralized water sterilized by passing through millipore filter and was equilibrated overnight at room termperature.

I claim:

1. A method for controlling mold growth in eggs comprising treating the shell surface of eggs with a fungicidally effective amount of a polyene antibiotic to prevent mold growth in eggs.

2. A method for controlling mold growth in eggs comprising applying to the shell surface of eggs to be protected from mold growth an aqueous solution containing a fungicidally effective amount of the order of 10 p.p.m. of an antibiotic selected from the group consisting of nystatin, pimaricin, and amphotericin B.

3. A method according to claim 2 in which the antibiotic is nystatin.

4. A method according to claim 2 in which the antibiotic is pimaricin.

5. A method according to claim 2 in which the antibiotic is amphotericin B.

References Cited

Miller, W. A., Poultry Science 35, 241–243 (1956).
Cotterill, O. J., et al., Poultry Science 35, 733–735 (1956).

A. LOUIS MONACELL, *Primary Examiner.*

HYMAN LORD, *Examiner.*

L. M. SHAPIRO, *Assistant Examiner.*